United States Patent [19]

Devlin

[11] 3,887,148

[45] June 3, 1975

[54] AIRCRAFT GLIDE SLOPE COUPLER AND LANDING SYSTEM

[75] Inventor: Bernard T. Devlin, Phoenix, Ariz.

[73] Assignee: Sperry Rand Corporation, New York, N.Y.

[22] Filed: Dec. 19, 1973

[21] Appl. No.: 426,264

[52] U.S. Cl.......... 244/77 A; 235/150.22; 343/108 R
[51] Int. Cl............................................. B64c 13/18
[58] Field of Search ...................... 73/178 R, 178 T; 235/150.22; 244/77 A; 318/583, 584; 343/5 LS, 7 TA, 108 R

[56] References Cited
UNITED STATES PATENTS

| | | | |
|---|---|---|---|
| 3,282,537 | 11/1966 | Lowell............................. | 244/77 A |
| 3,418,458 | 12/1968 | Majendie....................... | 244/77 A X |
| 3,652,835 | 3/1972 | Devlin et al.................... | 343/108 R X |
| 3,743,221 | 7/1973 | Lykken et al.................. | 244/77 A |
| 3,801,049 | 4/1974 | Simpson et al. ............... | 244/77 A |

*Primary Examiner*—Trygve M. Blix
*Assistant Examiner*—Stephen G. Kunin
*Attorney, Agent, or Firm*—Howard P. Terry

[57] ABSTRACT

A glide slope coupler, adapted for use in an integrated automatic pilot and flight director system provides apparatus for guiding an aircraft with respect to a radio defined glide slope to a flare out point, and for providing the flare out command for an automatic landing or for a flight director landing. An integrating device is used for synchronizing the coupler prior to glide slope mode engagement, and operates as a radio error integrator subsequent to autopilot glide slope engagement. The integrator operates to wash out the steady state flight path angle subsequent to flight director glide slope engagement. In the synchronizing mode, the elevator actuator amplifier output is forced to zero by the integrator to assure that no engage transients occur. At the same time, the integrator output is initialized by virtue of the system gain ratios, to a value approximately equal to the desired glide slope flight path angle. After glide slope engagement, the integrator output is summed with signals representing craft displacement from the glide slope, craft flight path angle, and short term damping signals, all for operation of the craft elevator surface or a flight director indicator pitch bar to reduce the radio defined path displacement to zero. As the aircraft descends through approximately 50 feet, radio gains are reduced to zero and the flare computer automatically computes a flare point and issues the proper flare commands for the specific conditions relative to descent rates and winds for each approach. The flare command automatically reduces shortly after touch down to cause the nose wheel to settle firmly on the landing surface. If the craft has a tendency to float due to abnormal conditions, this reduction in flare command will slightly increase the descent rate to assure a touch down within the longitudinal requirements.

7 Claims, 6 Drawing Figures 3,887,148

AIRCRAFT GLIDE SLOPE COUPLER AND LANDING SYSTEM

BACKGROUND OF THE INVENTION

1. Field of the Invention

The present invention relates to apparatus for the accurate guidance of aircraft to a landing with respect to a radio defined glide slope and pertains more particularly to a glide slope coupler system operable in both automatic pilot and flight director modes for guiding the craft during the beam capture, descent, flare, and touch down phases of the automatic approach and landing.

2. Description of the Prior Art

Typical prior art devices for use in glide slope coupler systems are discussed in the U.S. Pat. No. 3,058,699, issued Oct. 16, 1962 in the name of S. S. Osder, for an "Automatic Approach System for Aircraft", in the U.S. Pat. No. 3,059,881, issued Oct. 23, 1962, in the name of R. A. Letson, for an "Automatic Approach System for Aircraft", in the U.S. Pat. No. 3,052,427, issued Sept. 4, 1962 in the names of M. J. Match and K. Thomson for a "Flare-Out System for Aircraft", and in the U.S. Pat. No. 3,115,319, issued Dec. 24, 1963 in the names of M. B. Glaser and H. Miller for a "Flare-Out System", all of which patents are assigned to the Sperry Rand Corporation. The Osder and Letson patents relate to prior art apparatus for capturing the radio defined glide slope, while the Match et al and Glaser et al patents are concerned with apparatus for effecting a flaring maneuver in the landing pattern just prior to touch down.

These several patents are discussed as prior art in the U.S. Pat. No. 3,652,835, for an "Aircraft Glide Slope Coupler System", issued Mar. 28, 1972 in the names of B. T. Devlin and W. F. Poland and assigned to the Sperry Rand Corporation. The limitations of the prior art are discussed in that prior U.S. Pat. No. 3,652,835 in some detail and there is described therein a glide slope coupler system generally similar to the present invention. The system of that prior patent overcame difficulties of the aforementioned prior art by making continuous use of a signal representing displacement from the radio defined glide slope in conjunction with a memorized rate of descent signal and actual rate of descent from the commencement of the glide slope capture maneuver. Moreover, the system of that prior patent avoided the necessity present in other prior art systems of switching various signals during descent of the craft. Once the automatic pilot or flight director glide slope coupler was actuated, there was no necessity for further switching of signals, thus eliminating transient effects and generally enhancing the reliability of the system. The system of that prior patent advantageously employed a closed loop memory arrangement for flare control as opposed to the open loop flare control often appearing in prior art systems. In addition, the arrangement of that prior patent and of the present invention both avoid the considerable switching required in many prior art systems. The system of the prior patent and of the present invention accomplish the flare maneuver, in fact, without signal switching during capture, descent, or flare, the only switching required of the apparatus occuring upon initiation of the glide slope capture phase when the system is placed in automatic pilot or flight director control.

SUMMARY OF THE INVENTION

According to the present invention, an improved glide slope coupler is provided employing the general principles and advantages of the system of U.S. Pat. No. 3,652,835 and providing additional features for improving the operation and benefits thereof. In particular, the present invention employs a more reliable flight path angle signal for use as a damping term in both the automatic pilot and flight director modes in place of the previously employed barometric-inertial altitude rate and utilizes novel flare command terms to avoid reliance on the previously employed relatively unreliable altitude rate source. The use of flight path angle to provide the damping term is advantageous because effects of wind shear are substantially reduced. Furthermore, the system can be designed to revert to an altitude rate or lagged vertical acceleration damped system with degraded wind shear performance if any of the terms required for computation of flight path angle are invalid. In addition, the beam sensor is implemented down stream of the introduction of the altitude control into the glide slope displacement error. This feature permits consistent achievement of optimum beam capture for all realistic capture altitudes by keeping the distance to the radio defined path at capture constant, rather than keeping the angular deviation at capture constant.

Prior to glide slope capture, the coupler operates in a synchronizing mode. In this mode, the output of the elevator actuator amplifier is coupled back to the input of the integrator which provides an output signal for summing with and cancelling the glide slope beam displacement signal, the flight path angle signal, and the short term damping signals. System gains and the glide slope capture point are adjusted such that the integrator output at glide slope capture is approximately equal to the desired final flight path angle signal at the summing junction. Where glide slope capture is initiated as determined by the beam sensor, the integrator is switched out of the synchronizing mode and the elevator output, which is initially zero due to the synchronization, is coupled to the elevator actuator if the autopilot is engaged. The flight director amplifier is coupled to the flight director pitch bar if the flight director is engaged. The integrator substantially washes out the flight path angle immediately due to the initial condition obtained in the synchronizing mode. If the autopilot in engaged, the integrator continues effectively to wash out the flight path angle while operating as a radio error integrator. For the flight director mode only, the integrator is employed to wash out the flight path angle directly. The flight path angle provides the path mode damping throughout the glide path tracking mode, while the glide slope radio displacement signal provides the predominate control. As the craft descends, the glide slope displacement gain, as well as the glide slope integral gain in the autopilot mode, is reduced as a function of the altitude to compensate for the effect of beam convergence as the transmitter is approached. The gains are reduced to zero just prior to reaching the flare altitude.

The flare computer calculates the flare point and flare command for each descent in a manner making the touch down rate and touch down point relatively constant for all anticipated descent rates, wind conditions, and aircraft configurations. The flare altitude is computed by comparing radio altitude with a lagged altitude rate term initiated when the radio altitude reduces below the radio altitude input limit. When the lagged rate term exceeds the altitude term, the difference results in an output flare command from the asymmetric limiter. The flare point can therefore be adjusted by changing the input limit, the lagged rate time constant, or the ratio of the radio altitude to lagged radio altitude gains. Subsequent to the flare point, the lagged radio altitude rate output acts as a bias that determines the magnitude of the flare command. As the descent rate is reduced by the flare maneuver, the bias term peaks out just prior to normal touch down and starts to decrease. The resulting reduction in flare command prevents the aircraft from floating in abnormal wind conditions and brings the nose of the craft down after touch down to hold the aircraft firmly on the landing surface despite any positive pitching moment experienced when spoilers are activated to reduce the ground roll.

DESCRIPTION OF THE PREFERRED EMBODIMENT

Figure 1:
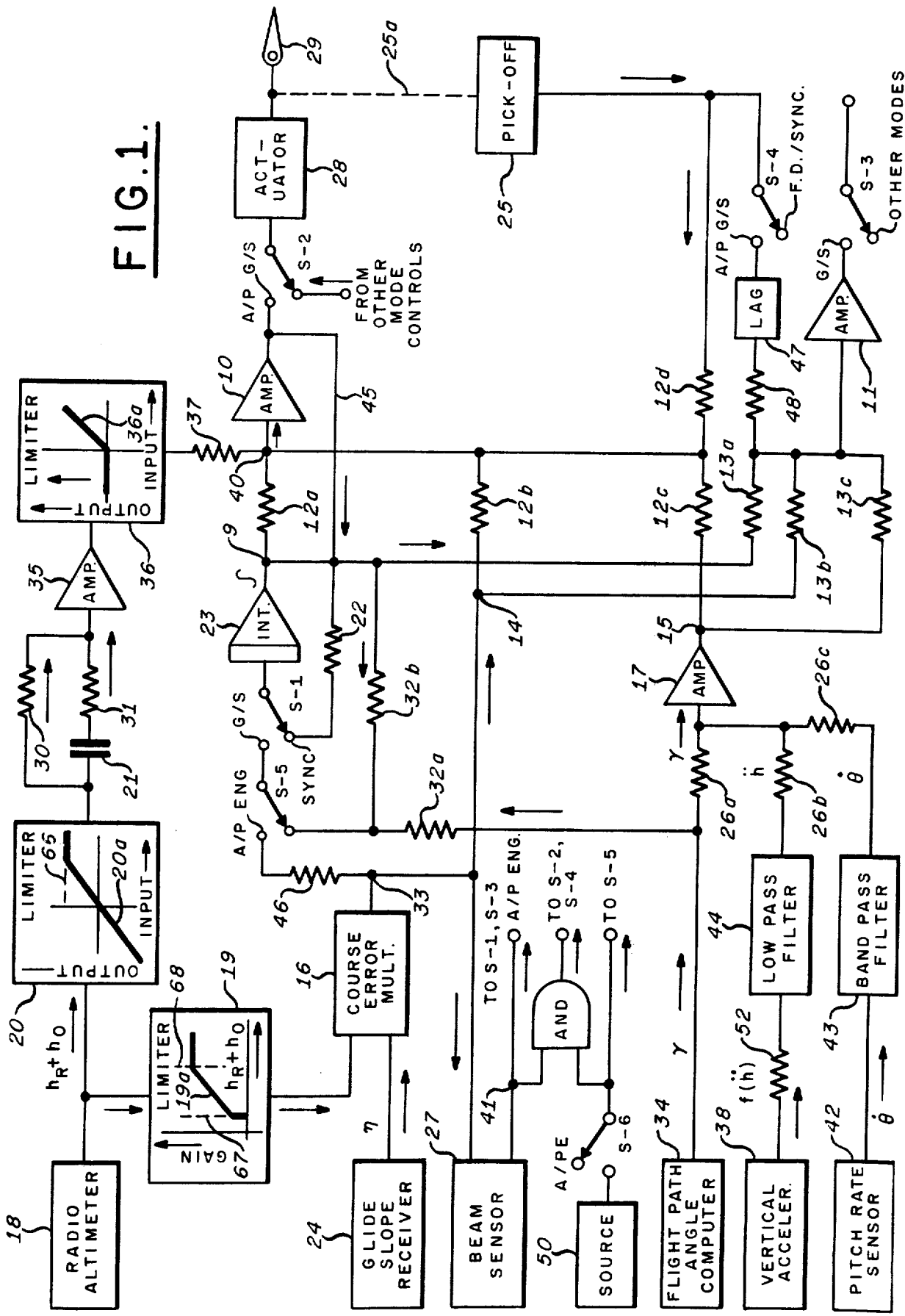
FIG. 1 is a block diagram of a single channel incorporating the invention showing its electrical and mechanical interconnections; the system would normally be incorporated in a dual or triple redundant channel configuration for fail passive or fail operational use.

The control signals employed in the novel glide slope and flare coupler include signals proportional to:

$h_R + h_o$ whose components respectively represent the radio altimeter defined altitude of the craft above the run way and a bias altitude conventionally included in the radio altimeter signal and equivalent to +20 feet, for example.

$\eta$ which is the angular displacement of the craft from the glide slope or other radio defined course, $\gamma$ which is the flight path angle of the craft, $\dot{h}_t$ which is the vertical acceleration of the craft, and $\dot{\theta}$ which is craft pitch rate.

Voltages proportional to these terms are provided respectively by conventional elements, including the radio altimeter 18, glide slope receiver 24, flight path angle computer 34, and the pitch angle rate generator pick off 42. The pitch angle rate term may be generated by a separate sensor or derived from the pitch angle output of a vertical gyroscope or inertial navigation unit. The vertical acceleration term may be taken from an inertial navigation unit or, as is well known in the art, may be approximated by a bank angle compensated normal accelerometer. These control terms are processed and summed in the radio-automatic pilot coupler system for the selective operation of the elevator control surface 29 of the craft via elevator power actuator 28 and, if desired, are also used to control the pitch bar of a flight director (not shown) through the instrument amplifier 11.

The conventional radio altimeter 18 supplies a voltage proportional to the term $h_R + h_o$ to limiters 19 and 20 having the input-output characteristics respectively indicated by graphs 19a and 20a. The several signal limiter devices employed in the invention are generally similar to those employed in the prior automatic pilot systems such as those represented in the Iddings U.S. Pat. No. 3,845,623 for an "Aircraft Navigation System", issued July 29, 1958, and in the Miller U.S. Pat. No. 3,691,356 for a "Speed Command and Throttle Control System for Aircraft", issued Sept. 12, 1972, both patents being assigned to the Sperry Rand Corporation.

Limiter 20 serves fully to limit positive voltages corresponding to a predetermined maximum altitude 66, such as 130 feet for a typical transport. An attenuated value of the output of limiter 20 is applied via resistor 30 to amplifier 35, while a parallel circuit including condenser 21 and resistor 31 couples to the amplifier 35 a signal proportional to lagged altitude rate $\dot{h}_R$. The output of amplifier 35 is coupled to signal limiter 36 whose output, in turn, passes through resistor 37 to be continuously present if finite at input junction 40 of amplifier 10 during operation of the aircraft. Amplifier 35 and limiter 36 cooperate as an asymmetric limiter to produce the limiter characteristic indicated by the graph 36a.

The output of radio altimeter 18 is additionally modified by the signal limiter characteristic 19a and supplied as one input to the radio error multiplier circuit 16, to a second input of which is coupled a signal proportional to the glide slope receiver 24 angular displacement error signal $\eta$. The cooperative gain programming action of limiter 19 and multiplier 16 is related to that of the Blackledge U.S. Pat. No. 3,381,295 for a "Radio Controlled Guidance Apparatus for Aircraft Having Radio Signal Gain Programming", issued Apr. 30, 1968 and assigned to the Sperry Rand Corporation. The limiter characteristic 19a has a cut off to zero output voltage for all altitudes below a predetermined value, such as 65 feet, and a knee at 68 which may correspond to flat limiting for altitude signals for a second predetermined value, such as 1,500 feet.

Radio error multiplier 16 may be a conventional analog multiplier device, producing because of its inputs, a product voltage proportional to $h_R\eta$ at its output terminal 33 which is employed by the invention in three ways. When the automatic pilot is engaged by closing switch S-6, any signal at terminal 33 is coupled to the glide slope terminal of switch S-1, to the beam sensor 27, and to junction 14 for purposes yet to be described. Where the signal is below a predetermined value, a discrete output of beam sensor 27 on terminal 41 is used to operate in a conventional manner the switches S-1, S-2 and S-3, with respect to their several possible conditions. When the human pilot closes switch S-6, the automatic pilot is engaged in the conventional manner (by apparatus not shown) by energy supplied by electrical source 50. Additionally, switch S-5 is thereupon moved to its A/PENG or automatic pilot engaged position. The several switches, including switch S-5, may all be relay solenoid-operated switches or semiconductor switches, as will be apparent to those skilled in the art. Switches S-1 and S-3 are directly under the control of beam sensor 27. On the other hand, switches S-2 and S-4 are jointly controlled via AND circuit 53 by the state of switch S-6 and by the presence or absence of the discrete voltage at the output of beam sensor 27. During normal cruising flight, switches S-2 and S-3 are in the cruise or other modes position indicated in FIG. 1, and the novel coupler system is not then in control of elevator 29 or of flight director amplifier 11. By other modes is meant pitch, altitude, or Mach hold modes, for example.

Integrating amplifier 23 operates as a pre-glide slope engage synchronizer, maintaining the output of amplifier 10 at zero signal until switch S-1 is activated at glide slope engage by beam sensor 27. In this condition, any output of amplifier 10 is passed through resistor 22 and through switch S-1 in its SYNC. position to integrating amplifier 23 and thence through resistor $12a$ back to input terminal 40 of amplifier 10. This closed loop circuit thus remains in a synchronized condition until a predetermined positive or negative voltage level, which may be on the order of ±30 millivolts, appears on the beam sensor output terminal 41 as the antenna of receiver 24 approaches the glide slope at which time switches S-1, S-2, and S-3 are activated. Switch S-1 is moved to the G/S or glide slope position and switch S-2 from the cruise or other modes position to its autopilot-glide slope position.

The signal at terminal 40 also includes a summation of terms supplied from signal sources 24, 34, 38, 42, and 25. As noted above, the glide slope displacement error term $\eta$ is supplied to junction 14 and thence through resistor $12b$ to input terminal 40. Signals found at junctions 15 are similarly supplied through resistor $12c$ to terminal 40.

Figure 2:
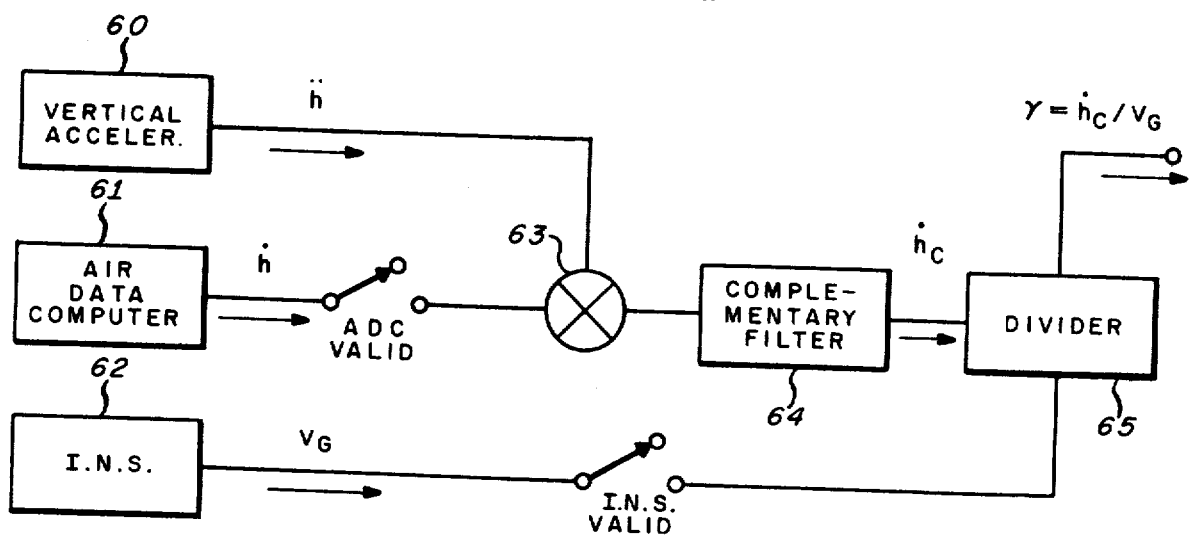
FIG. 2 is a block diagram illustrating a possible flight path angle computer with valid switch reversion for use in the apparatus of FIG. 1.

The electrical signals supplied by amplifier 17 at junction 15 also include terms proportional to $\ddot{h}_t$, $\dot{\theta}$, and $\gamma$, as previously noted. The signal proportional to vertical acceleration $\ddot{h}$ is not necessary for an acceptable system, but provides improved turbulence and wind shear performance, and may be obtained from an inertial navigation system or from a bank angle compensated normal accelerometer. The $\ddot{h}$ signal is coupled through noise filter 44, resistor $26b$, and amplifier 17 to junction 15. The signal proportional to pitch rate $\dot{\theta}$ from pitch rate generator 42, which provides the short term damping, is coupled through band pass filter 43, resistor $26c$ and amplifier 17 to junction 15. Band pass filter 43 serves to remove undesired noise and steady state signals from the output of sensor 42. The final signal also appearing at junction 15 is the term proportional to flight path angle $\gamma$, which provides the path damping for the glide slope capture and track modes and for the exponential flare mode. As shown in FIG. 2, flight path angle $\gamma$ may be computed from barometric altitude rate $\dot{h}$, vertical acceleration $\ddot{h}$, and ground speed $V_G$. Conventional signal valid logic may be employed to revert to a complimented altitude rate damping signal if ground speed data is not valid, and further to a lagged vertical acceleration damping signal if barometric altitude rate $\dot{h}$ is invalid. If ground speed $V_G$ is valid, and barometric altitude rate $\dot{h}$ and vertical acceleration $\ddot{h}$ are valid, the damping signal is equivalent to a washed out flight path angle. This reversion capability is obtained by setting the time constant of the complementary filter 64 long enough to ensure that the majority of the damping is provided by the lagged vertical acceleration term. Thus, loss of ground speed and/or barometric altitude rate results in an acceptable system, but a system having reduced damping and reduced wind shear performance.

It will be understood that the aforedescribed signals when appearing at junctions 9, 14, and 15 are coupled to the input junction 40 of amplifier 10 for synchronizing operation of the circuit loop employing integrator 23 or, with switches S-1 and S-2 moved to their glide slope contacts, for the operation of the control surface actuator 28 and elevator 29. A further signal summed at terminal 40 is an elevator position feed back signal generated by the position pick off 25 coupled to move in synchronism with elevator 29 by mechanical link $25a$. The output of pick off 25 is coupled through resistor $12d$ for summation at terminal 40. This signal must be included in the synchronizing mode to allow the integrating amplifier to store a signal equivalent to surface mistrim to assure that a maneuver due to instantaneous recentering of the elevator does not occur when the glide slope mode is engaged.

For operation of the pitch bar of a flight director, the described signals when appearing at junctions 9, 14, and 15 are respectively coupled through resistors $13a$, $13b$, $13c$ to the input of a flight director amplifier 11 whose output is in the flight director activating position when switch S-3 is properly closed. If the autopilot is engaged, switch S-4 is actuated to contact the flight director-glide slope contact. Then the elevator position transducer is coupled through the conventional lag circuit 47 and is then applied through resistor 48 as a further input to amplifier 11 so as to cancel any mistrim error being held by the autopilot. In the flight director-glide slope mode only, the switch S-1 contacts its flight director-glide slope contact. Then, any output of flight path angle computer 34 is coupled through resistor 32a and the normally closed contact of S-5 into integrator 23. At the same time, any output of integrating amplifier 23 is coupled via resistor 32b to be added to the flight path angle input of integrator 23, resulting in a signal at the output of the integrator 23 to wash out the steady state flight path angle signal.

Operation of the invention will be further discussed with reference to FIGS. 1 and 3 through 6. The radio beam sensor 27 of FIG. 1 is adjusted to trip when the programmed radio error is less than a predetermined value, such as the aforementioned ±30 millivolts. Prior to tripping of radio beam sensor 27, the novel coupler system is synchronized by feeding the output of integrator 23 back to its input through the high gain amplifier 10. The output of integrator 23 substantially cancels voltages proportional to glide slope radio error and flight path angle at junction 40, so that when the beam sensor 27 is tripped, a substantially zero error signal continues to appear at terminal 40. For this purpose, the various gains in the system are pre-adjusted so that a 30 millivolt error, for example, corresponds to a flight path angle $\gamma$ slightly greater than the desired glide slope angle. Accordingly, for a standard, constant altitude or zero flight path angle approach toward the landing field, the output of integrator 23 is pre-set in synchronized state at substantially the voltage level required for achieving the desired approach flight path angle.

At the initial condition time that the beam sensor 27 trips for the constant altitude approach, the initial conditions of the principal signals radio displacement error $\eta$, integrator output $f$, and flight path angle $\gamma$ are such that their sum is zero at junction 40. For example, if the beam sensor 27 trips at 30 millivolts for the straight and level flight condition:

$$\eta + \int +\gamma = +30 - 30 + 0 = 0$$

As the craft continues toward the radio defined course:

$$\eta + \int +\gamma = +29 - 30 + 0 = -1$$

Figure 3:
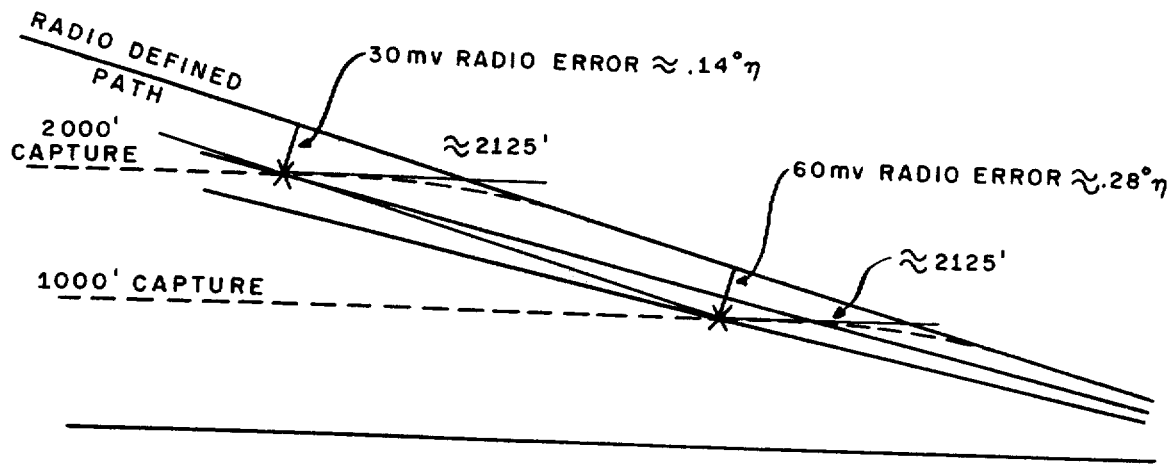
FIGS. 3, 4, and 5 represent glide slope capture situation under three typical approaches to the radio defined course.

Accordingly, a −1 millivolt fly down command results at junction 40 and the asymptotic capture maneuver of FIG. 3 is commenced.

FIG. 3 represents two such sequences for below-the-beam capture for radio altitudes of 2000 and 1000 feet, respectively, assuming linear programming of the vertical beam sensor 27 with radio altitude $(h_R + h_a)$. During capture the output $\int$ of integrator 23 decreases slightly due to integration of the fly up radio command, so that the status at the end of asymptotic capture is:

$$\eta + \int +\gamma = 0 - 27 + 27 = 0$$

FIG. 3 illustrates the advantage of locating the beam sensor 27 downstream of the radio error multiplier 16 of FIG. 1. At all altitudes, capture is accordingly allowed to commence at the same distance from the radio defined path by sensing the appropriately gain-programmed radio error signal.

Figure 4:
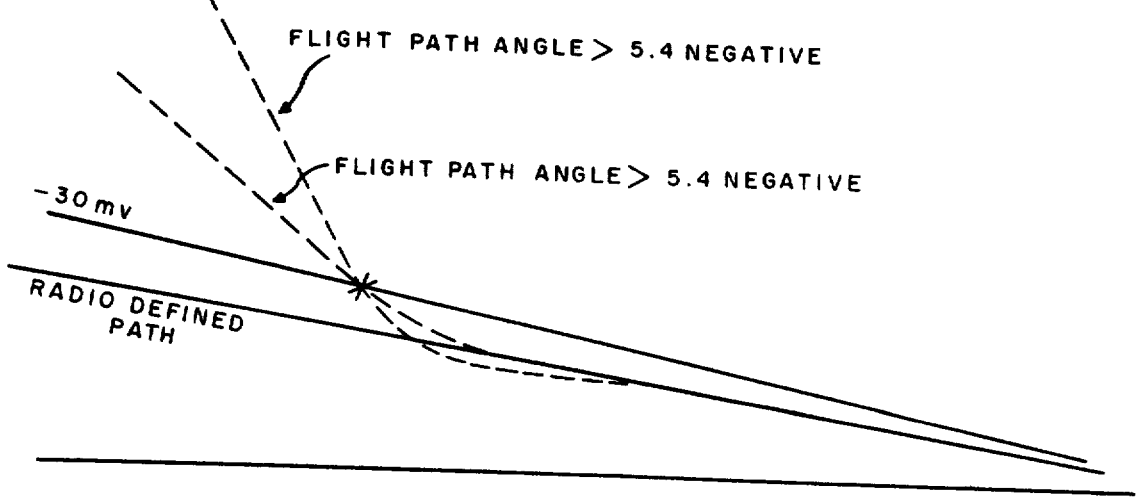
Figure 5:
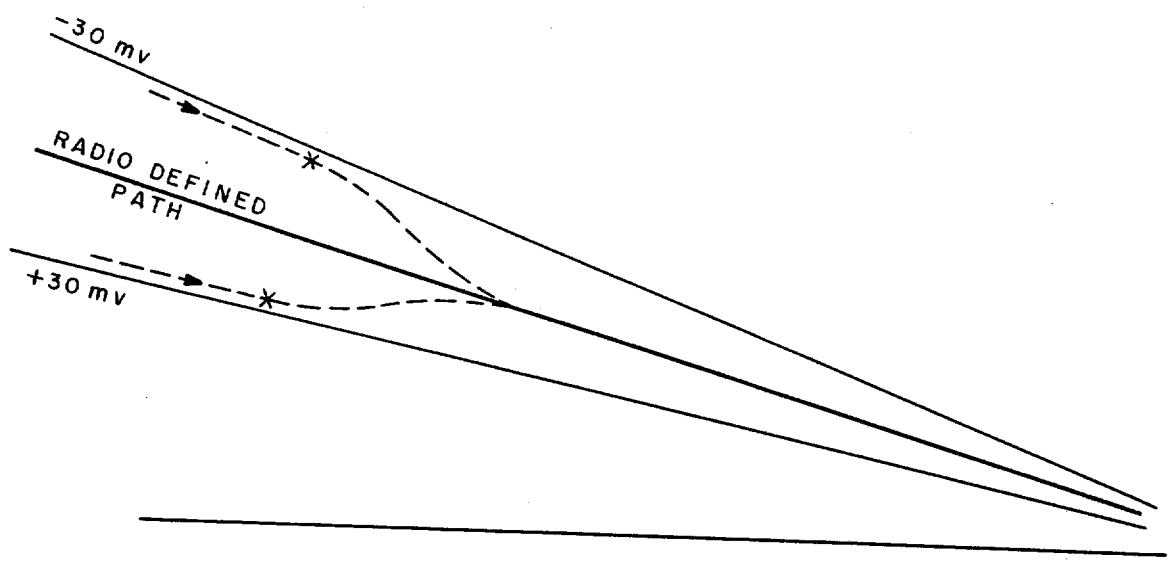

For two typical instances, above-the-radio course capture is illustrated in FIG. 4; for the case in which the radio defined course is intercepted at a −5.4° flight path angle, for example, the signal at junction 40 may be:

$$\eta + \int +\gamma = -30 - 24 + 54 = 0$$

As the craft continues toward the radio defined course and at 24 millivolts radio displacement error:

$$\eta + \int +\gamma = -29 - 24 + 54 = +1$$

Thus, a +1 fly up command appears at terminal 40 and the asymptotic capture maneuver begins. FIG. 4 illustrates that a slight over-shoot may be required for initial flight angles of greater than −5.4° for the gains chosen by way of illustration. The status at the end of the asymptotic capture is as before:

$$\eta + \int +\gamma = 0 - 27 + 27 = 0$$

For the third of the illustrated situations, one in which the approach flight is substantially parallel to the radio defined course, the respective initial conditions for above-the-glide slope approach are:

$$\eta + \int +\gamma = +25 - 52 + 27 = 0$$

and for below-the-glide slope approach are:

$$\eta + \int +\gamma = -25 - 2 + 27 = 0$$

for an initial 25 millivolt angular offset of the craft from the radio defined path. For both examples, the status after asymptotic capture is again:

$$\eta + \int +\gamma = 0 - 27 + 27 = 0$$

Throughout the remainder of the radio controlled approach after asymptotic capture, the gain programming accomplished by limiter 19 and radio error multiplier 16 effectively controls the gain of the error signal as a function of radio altitude so as to compensate for the convergence of the glide slope as the craft approaches the radio transmitter. Thus, the servo system exhibits substantially constant sensitivity throughout the final approach. The integrator 23 continues substantially to cancel the steady state flight path angle $\gamma$ as it integrates the radio guidance error to zero. Operation of the flight director for achieving capture of the radio defined path and its subsequent tracking is according to generally the same principles as used in the system when in automatic pilot control, except that no radio error integrator is required and the integrator is used to wash out flight path angle.

The flare computer used both with automatic pilot and flight direction operation consists, as previously described, of the limiter 20, the rate plus displacement network 21, 30, 31, and the asymmetric output limiter system 35, 36. Until the output of radio altimeter 18 decreases below the input limit 66, the altitude rate derived by network 21, 31 is zero and the limited altitude signal accordingly holds the output of limiter 36 at its zero flight path angle limit. However, when the output of radio altimeter 18 falls below limit 66, a lagged rate is computed by circuit 21, 31. When the lagged rate term exceeds the altitude displacement signal passed by resistor 30, a positive flight path command is generated and is inserted at junction 40 to initiate the flared manuever. The flare system is somewhat analagous to standard displacement plus rate control systems, with a time constant proportional to the ratio of flight path angle gain and radio altitude gain.

Figure 6:
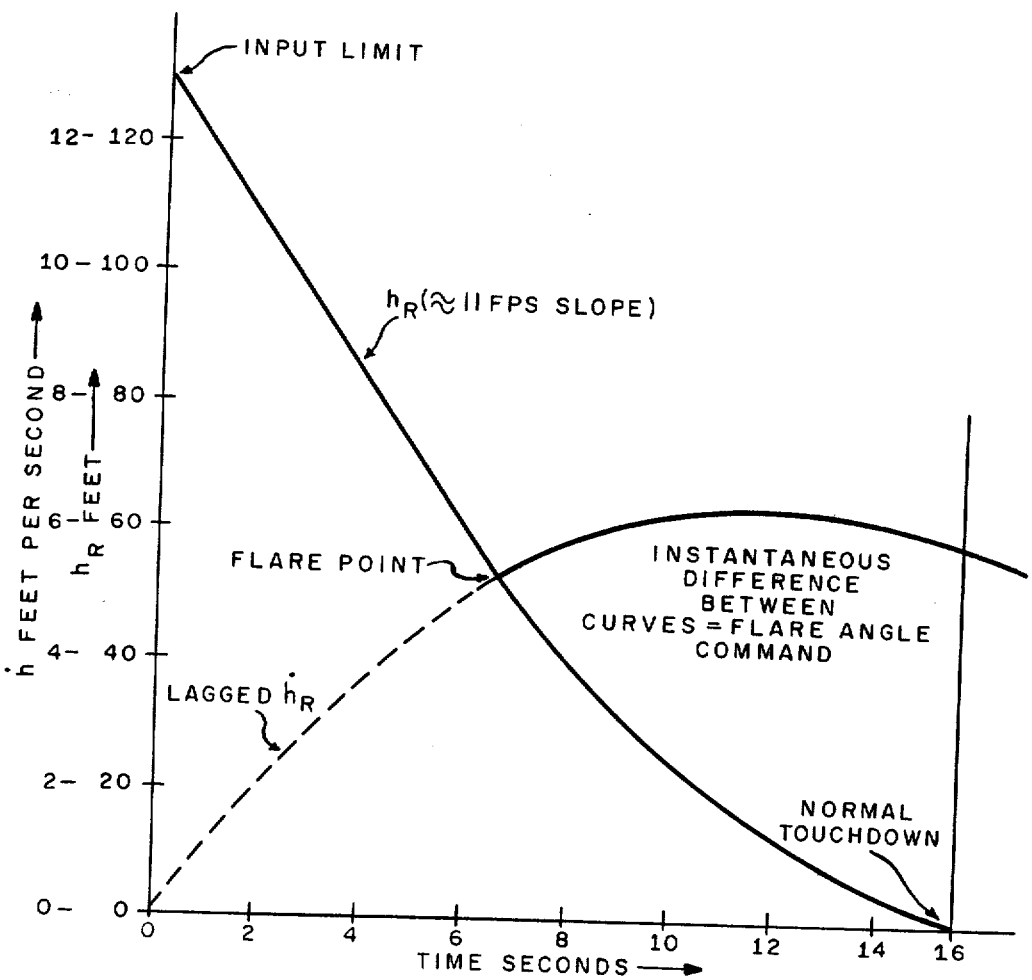
FIG. 6 is a graph additionally useful in explaining the operation of the invention.

The system has the advantage of calculating a flare point permitting automatic landings with a precision substantially unaffected by normal runway threshold abnormalities, such as rapid terrain changes which cause wild altimeter variations, while prior systems using derived radio altitude rate in the control law are undesirably sensitive to such abnormalities. The calculated flare point (FIG. 6) is made automatically variable so as to allow initiation of the flare maneuver at slightly higher altitudes for high descent rates. The flare altitude is a function both of rate of descent and of the time for the lagged rate input to amplifier 35 to exceed its input displacement term once limit 66 is reached. As is seen in FIG. 6, the actual flare command at any time instant after the flare point is reached is the difference between the lagged rate $h$ and displacement h signals. For high descent rates, this difference is greatest and a large flare command results. Ultimately, the difference between the two signals begins to decrease with time because the lagged rate term passes its peak value prior to normal touch down. This desirable feature prevents the craft from experiencing over-flare and from tending to float. As the lagged rate term continues to decrease, the result is that the positive flight path angle command at junction 40 decreases, producing a fly down command that places the nose wheel of the craft firmly on the run way shortly after main gear touch down.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Apparatus for guiding a craft to a landing with respect to a radio defined path, comprising:
    means for providing a first output signal representative of craft altitude above a landing surface,
    flare computer means including first asymmetric limiter means and responsive to said first output signal for providing a second output signal only for a signal of predetermined input polarity, second asymmetric limiter means responsive to said first output signal for producing a third output signal, glide slope receiver means for producing a fourth output signal representative of the displacement of said craft from said radio defined path, multiplier means for producing a product output signal proportional to the product of said third and fourth output signals, flight path angle computer means for deriving a fifth output signal, circuit means for combining said second, fifth, and product output signals for selective control of the attitude of said craft about the pitch axis thereof, said fifth output signal substantially reducing the effects of wind shear in the approach to landing.

2. Apparatus as described in claim 1 additionally including:

means for deriving a signal representative of craft vertical acceleration, means for deriving a signal representative of craft pitch rate, and means for additionally combining said signals representing craft vertical acceleration and craft pitch rate for positioning said craft about said pitch axis.

3. Apparatus as described in claim 2 additionally including flight director pitch bar means selectively responsive to said composite signal.

4. Apparatus as described in claim 1 additionally including means for generating a sixth output signal representative of craft elevator position for summation with said second, fifth, and product output signals, and said signals representing craft vertical acceleration and pitch rate for providing a composite signal for positioning said craft about said pitch axis.

5. Apparatus as described in claim 4 additionally including synchronizing means responsive to said composite signal comprising:

integrator means, amplifier means responsive to said composite signal and to said integrator means, said integrator means being selectively responsive to said amplifier means, and means for selectively coupling said amplifier means to means for positioning said craft about said pitch axis.

6. Apparatus as described in claim 4 additionally including:

beam sensor means responsive to said product output signal, and first switch means responsive to said beam sensor means for coupling said product output signal to said integrator means input while disconnecting the output of said amplifier from said integrator input, said beam sensor cooperatively operating to permit the radio defined path to be captured at substantially the same displacement from said radio defined path independent of craft altitude.

7. Apparatus as described in claim 6 additionally including second switch means for simultaneous operation with said first switch means in response to said beam sensor means for rendering effective the output of said amplifier with respect to said means for positioning said craft about said pitch axis.

* * * * *